United States Patent
Lee et al.

(10) Patent No.: US 9,826,473 B2
(45) Date of Patent: Nov. 21, 2017

(54) METHOD AND APPARATUS FOR SCANNING ACCESS POINT IN WIRELESS COMMUNICATION SYSTEM

(71) Applicant: Samsung Electronics Co., Ltd, Gyeonggi-do (KR)

(72) Inventors: Jin-Sung Lee, Gyeonggi-do (KR); Ha-Kyung Jung, Seoul (KR); Jung-Shin Park, Seoul (KR); Beom-Sik Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/723,159

(22) Filed: May 27, 2015

(65) Prior Publication Data

US 2015/0351026 A1 Dec. 3, 2015

(30) Foreign Application Priority Data

May 27, 2014 (KR) ........................ 10-2014-0063890

(51) Int. Cl.
*H04W 28/00* (2009.01)
*H04W 48/20* (2009.01)
(Continued)

(52) U.S. Cl.
CPC ....... *H04W 48/20* (2013.01); *H04W 28/0226* (2013.01); *H04W 40/244* (2013.01);
(Continued)

(58) Field of Classification Search
CPC combination set(s) only.
See application file for complete search history.

(56) References Cited

U.S. PATENT DOCUMENTS 7,844,269 B2 11/2010 Abdel-Kader
7,907,582 B2 * 3/2011 Du ........................ H04W 48/20
370/252

(Continued)

FOREIGN PATENT DOCUMENTS

KR 20140015823 A 2/2014

OTHER PUBLICATIONS

International Search Report dated Aug. 24, 2015 in connection with International Application No. PCT/KR2015/005303; 3 pages.
(Continued)

*Primary Examiner* — Frank Duong

(57) ABSTRACT

Provided is a method for scanning an Access Point (AP) in a wireless communication system. The method includes receiving a beacon frame from a proximity AP located within a proximity of a User Equipment (UE) and determining whether a channel where the proximity AP is located is congested; if the channel is not congested, scanning at least one AP operating on the channel, and searching for a first AP that can communicate with a highest signal strength; determining whether to perform re-scanning for an AP in the channel; if it is determined to perform the re-scanning, predicting a time that a beacon frame is to be transmitted from the first AP; receiving a beacon frame from the first AP at the predicted time, and determining whether the channel where the first AP is located is congested; and if the channel is not congested, re-scanning at least one AP operating on the channel.

28 Claims, 6 Drawing Sheets

(51) Int. Cl.
*H04W 40/24* (2009.01)
*H04W 72/04* (2009.01)
*H04W 72/10* (2009.01)
*H04W 28/02* (2009.01)
*H04W 84/12* (2009.01)
*H04W 48/16* (2009.01)

(52) U.S. Cl.
CPC ....... *H04W 72/0486* (2013.01); *H04W 72/10* (2013.01); *H04W 48/16* (2013.01); *H04W 84/12* (2013.01)

(56) References Cited

U.S. PATENT DOCUMENTS

| | | | |
|---|---|---|---|
| 8,988,999 B2* | 3/2015 | Sirotkin | H04W 28/0247 370/230 |
| 9,066,283 B2* | 6/2015 | Seok | H04W 48/20 |
| 9,137,738 B2* | 9/2015 | Lee | H04W 48/12 |
| 2006/0040656 A1 | 2/2006 | Kotzin | |
| 2006/0182023 A1 | 8/2006 | Bejerano et al. | |
| 2011/0164520 A1* | 7/2011 | Kostic | H04L 47/10 370/252 |
| 2011/0286329 A1 | 11/2011 | Koo et al. | |
| 2014/0003237 A1 | 1/2014 | Kenney et al. | |
| 2014/0010157 A1 | 1/2014 | Hsieh | |
| 2014/0064128 A1 | 3/2014 | Park et al. | |
| 2015/0208330 A1* | 7/2015 | Park | H04W 48/16 370/338 |

OTHER PUBLICATIONS

Written Opinion dated Aug. 24, 2015 in connection with International Application No. PCT/KR2015/005303; 6 pages.

Gollakota, et al.; "ZigZag Decoding: Combating Hidden Terminals in Wireless Networks,"; ACM Sigcomm; Aug. 17-22, 2008; pp. 159-170.

Cheng, et al.; "Jigsaw: Solving the Puzzle of Enterprise 802.11 Analysis," ACM Sigcomm; Sep. 11-15, 2006; 12 pages.

LaCurts, et al.; "Measurement and Analysis of Real-World 802.11 Mesh Networks,"; ACM IMC~; Nov. 1-3, 2010; pp. 123-136.

3GPP TSG-RAN WG2 Meeting #82; "WLAN scanning power consumption benchmarks"; R2-132034; Fukuoka, Japan, May 20-24, 2013; 2 pages.

Berezin, et al.; "Citywide Mobile Internet Access Using Dense Urban WiFi Coverage,"; ACM UrbaNE; Dec. 10, 2012; pp. 31-36.

3GPP TSG-RAN WG2 Meeting #82; "On WLAN Power Consumption for WLAN-3GPP Interworking"; R2-131780; Fukuoda, Japan, May 14-20, 2013; 5 pages.

Huang, et al.; "A Close Examination of Performance and Power Characteristics of 4G LTE Networks,"; ACM MobiSys; Jun. 25-29, 2012; 14 pages.

3GPP TSG-RAN2 Meeting #81; "WLAN load information for mobility support"; R2-130051; St. Julian's Malta, Jan. 28-Feb. 1, 2013; 3 pages.

IEEE Std 802.11-2012, "Part 11: Wireless LAN Medium Access Control MAC and Physical Layer PHY Specifications"; Mar. 29, 2012; 2,793 pages.

Castignani, et al.; "Urban 802.11 Community Networks for Mobile Users: Current Deployments and Prospectives,"; Mobile Netw Appl; Aug. 23, 2012; pp. 796-807.

Castignani, et al.; "An Evaluation of IEEE 802.11 Community Networks Deployments,"; IEEE ICOIN; 2011; pp. 498-503.

Jana, et al.; "On Fast and Accurate Detection of Unauthorized Wireless Access Points Using Clock Skews"; IEEE Trans. on Mobile Computing; Mar. 2010; pp. 449-462.

* cited by examiner

METHOD AND APPARATUS FOR SCANNING ACCESS POINT IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on May 27, 2014 and assigned Serial No. 10-2014-0063890, the entire disclosure of which is incorporated herein by reference.

TECHNICAL FIELD

The present disclosure relates to a method and apparatus for scanning an Access Point (AP) to perform data communication using a Wireless Local Access Network (WLAN) by a User Equipment (UE) in a wireless communication system.

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the development of information and communication technologies, a variety of wireless communication technologies have been developed. Among them, WLAN is technology for allowing a user to wirelessly access the Internet in a particular service area such as home, company or aircraft, using a mobile terminal such as Personal Digital Assistant (PDA), laptop computer, Portable Multimedia Player (PMP), and the like, based on the radio frequency technology.

Owing to the increased utilization of WLAN, a mobile terminal user such as a laptop computer user may now work with increased mobility. For example, the user can take a laptop computer from his/her own desk to a conference room to attend a meeting while keeping the laptop computer connected to his/her local network to receive data and can access the Internet through a modem or a gateway in the local network without the constraints of the wired connection. Similarly, even business travelers can use the mobile terminal to access their own e-mail accounts in order to receive or send an e-mail or to check an e-mail.

The early WLAN technology was to support the rate of 1-2 Mbps with frequency hopping, spread spectrum and infrared communication by using a 2.4 GHz frequency in accordance with IEEE 802.11. Recently, with the development of wireless communication technologies, the WLAN technology makes it possible to support the rate of a maximum of 54 Mbps by applying Orthogonal Frequency Division Multiplexing (OFDM) technology and the like to WLAN. In addition, in IEEE 802.11, wireless communication technologies have been developed and put to practical use, for improvement of Quality of Service (QoS), AP protocol compatible, security enhancement, radio measurement or radio resource measurement, wireless access in vehicular environment, fast roaming, mesh network, interworking with external network, wireless network management, and the like.

In the WLAN system, a UE performs an AP scanning process to find an accessible AP. The AP scanning process is a process in which a UE acquires a list of candidate APs that the UE will join in the succeeding joining process to be a member of a particular Extended Service Set (ESS), and also acquires information about each of the APs.

The AP scanning process includes a passive scanning method or an active scanning method. The passive scanning method is a method in which a UE receives a beacon frame that an AP transmits periodically (typically, every 100 ms), to check the presence of the AP. In this method, the UE requires time of 100 ms per channel depending on when the UE has acquired the beacon frame. The active scanning method is a method in which a UE directly sends a probe request frame to an AP, and upon receiving the probe request frame, the AP sends a probe response frame to the UE, thereby notifying the presence of the AP itself. The active scanning method is typically shorter than the passive scanning method in terms of the time that the UE scans an AP for each channel, but the UE should undesirably send an additional probe request frame. In addition, even the AP should undesirably generate an additional probe response frame in addition to the beacon frame.

Therefore, there is a need for an efficient AP scanning method for reducing the time required for AP scanning to allow a UE to quickly access an AP, and to reduce power consumption of a UE.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide, for use in a method and apparatus for scanning an AP to quickly access an AP by a UE in a wireless communication system.

According to various embodiments of the present disclosure is to provide a method and apparatus for scanning an AP by using load information provided from an AP by a UE in a wireless communication system.

In accordance with an aspect of the present disclosure, a method provides for scanning an Access Point (AP) in a wireless communication system. The method includes receiving a beacon frame from one proximity AP close to or located within a proximity of a User Equipment (UE), and determining whether a channel where the proximity AP is located is congested, based on the received beacon frame; if the channel is not congested, scanning at least one AP operating on the channel, and searching for a first AP that can communicate with the UE with highest signal strength, among the scanned at least one AP; determining whether to perform re-scanning for an AP in the channel; if it is determined to perform the re-scanning, predicting a time that a beacon frame is to be transmitted from the first AP; receiving a beacon frame from the first AP at the predicted time, and determining whether the channel where the first AP is located is congested, based on the beacon frame received from the first AP; and if the channel is not congested, re-scanning at least one AP operating on the channel.

In accordance with another aspect of the present disclosure, an apparatus provides for scanning an Access Point (AP) in a wireless communication system. The apparatus includes a short-range communication module configured to receive a beacon frame from one proximity AP close to or located within a proximity of a User Equipment (UE); and a controller configured to: determine whether a channel where the proximity AP is located is congested, based on the received beacon frame; if the channel is not congested, control the short-range communication module to scan at least one AP operating on the channel; search for a first AP that can communicate with the UE with highest signal strength, among the scanned at least one AP, and determine whether to perform re-scanning for an AP in the channel; if it is determined to perform the re-scanning, predict a time that a beacon frame is to be transmitted from the first AP; control the short-range communication module to receive a beacon frame from the first AP at the predicted time; determine whether the channel where the first AP is located is congested, based on the beacon frame received from the first AP; and if the channel is not congested, control the short-range communication module to re-scan at least one AP operating on the channel.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
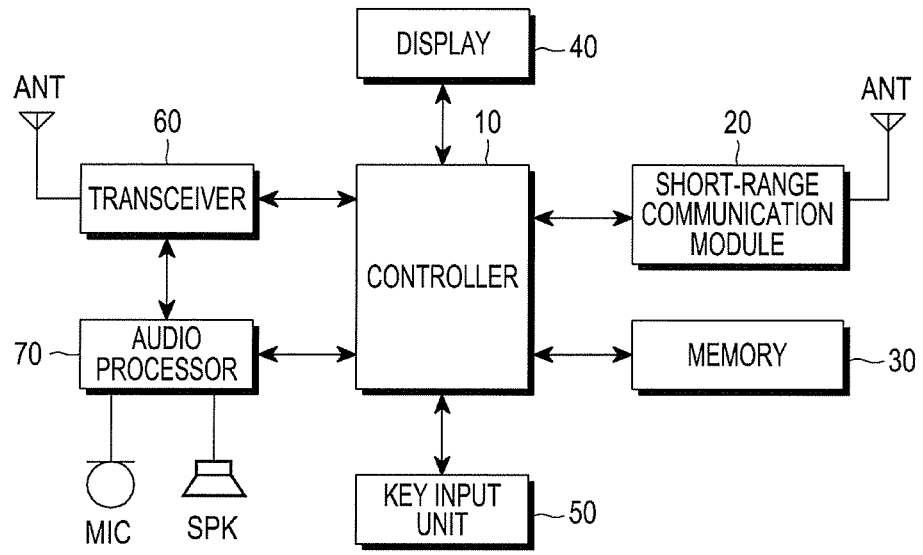
FIG. 1 illustrates a configuration of a device for scanning an AP according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

With respect to the main subject of the present disclosure, a UE determines the congestion of a channel by using Basic Service Set (BSS) load information included in a beacon frame received from a proximity AP, to scan at least one AP operating on a channel that is not congested.

Specifically, when a UE that provides a data service over the cellular network has accessed a Wireless Fidelity (Wi-Fi) network, the UE should consider not only the signal strength but also the channel congestion in order to provide the same performance to the user over WLAN. The channel congestion information needs to be collected in real time since the channel congestion information is susceptible to the time, and in a wide frequency band such as 5 GHz, the UE requires a long scanning time due to the increase in the number of independent channels. Therefore, in order for a UE to access the best AP considering both of the signal strength and the channel congestion in a short time, there is a need for a method of quickly scanning an AP by using BSS load information included in a beacon frame.

A detailed description will now be made of a method and apparatus for scanning an AP in a wireless communication system according to various embodiments of the present disclosure.

FIG. 1 illustrates a configuration of a device for scanning an AP according to various embodiments of the present disclosure. The device for scanning an AP is a UE.

Referring to FIG. 1, a transceiver 60 includes a Radio Frequency (RF) processor and a modem, and transmits and receives signals under control of a controller 10. An audio processor 70 constitutes a codec and processes a voice signal and an audio signal. A key input unit 50 includes keys required to enter numeric and character information and function keys required to set various functions, or includes a touchpad and the like. When a display 40 is implemented in a touch screen manner such as capacitive touch screen or a resistive touch screen, the key input unit 50 includes a minimum number of preset keys, and the display 40 replaces some of the key input functions of the key input unit 50. In particular, in order to reflect user preference during AP scanning, the user inputs at least one of a parameter for determining a proximity AP, a parameter for determining the congestion of a channel and his/her desired channel, using the key input unit 50 according to various embodiments of the present disclosure. The desired channel is a channel by which the user can access a channel operated by a particular operator.

A memory 30 includes a program memory and a data memory, and the program memory stores a program for controlling the overall operation of the UE. In particular, the memory 30 according to various embodiments of the present disclosure stores a channel list for performing AP scanning and an AP list including AP information for each channel. The channel list and the AP list are updated during an AP scanning operation.

A short-range communication module 20 provides a short-range wireless communication function such as Wireless Fidelity (Wi-Fi) or Wireless Broadband (WiBro). For example, the short-range communication module 20 provides the short-range wireless communication function to the user by accessing an AP in accordance with the IEEE 802.11 standard.

In particular, the short-range communication module 20 according to various embodiments of the present disclosure performs passive scanning under control of the controller 10. In performing passive scanning, the short-range communication module 20 receives a beacon frame from an AP during a beacon interval (typically, 100 ms) for each channel and forwards the received beacon frame to the controller 10.

The display 40 includes a Liquid Crystal Display (LCD) panel or an Organic Light Emitting Diodes (OLED) panel and outputs a variety of display information that is generated in the UE. The display 40 includes a touch screen to operate as an input unit that controls the UE together with the key input unit 50.

The controller 10 controls the overall operation of the UE according to various embodiments of the present disclosure. In particular, upon detecting a UE use request, the controller 10 controls the short-range communication module 20 so as to perform AP scanning and searches for the best AP based on the BSS load information included in the beacon frame received from the short-range communication module 20.

Specifically, the controller 10 performs an AP scanning operation according to various embodiments of the present disclosure, as follows. Herein, an operation of initially scanning an AP by a UE in the current location will be defined as an initial scanning operation, and an operation of re-scanning an AP by a UE in the location where the initial scanning operation was performed will be defined as a re-scanning operation. The re-scanning operation is performed when the UE has not moved from the location where the initial scanning operation was performed, when all channels are high in congestion, when the current communication channel is high in congestion, or when the UE is preset to perform re-scanning at predetermined intervals.

A description will now be made of how the controller 10 performs an initial scanning operation according to various embodiments of the present disclosure.

The controller 10 controls the short-range communication module 20 so as to scan an AP for each channel using passive scanning. The controller 10 receives a beacon frame from an arbitrary AP for a particular channel through the short-range communication module 20. The controller 10 determines whether the arbitrary AP is a proximity AP.

In determining whether the arbitrary AP is a proximity AP, the controller 10 uses at least one of the following examples.

As an example, using signal strength of a beacon frame received from an AP, the controller 10 determines the arbitrary AP as a proximity AP, when the signal strength (e.g., Received Signal Strength (RSS) or Signal-to-Noise Ratio (SNR)) of the received beacon frame is greater than or equal to a predetermined threshold. As another example, the controller 10 determines whether the arbitrary AP is a proximity AP, by receiving location information about the arbitrary AP from an evolved Node B (eNB) or an Access Network Discovery and Selection Function (ANDSF) server, or by using a Global Positioning System (GPS). As another example, the controller 10 directly receives location information from an AP. The AP provides its own location information using a 'Vendor Specific' element of a beacon frame. As another example, the controller 10 acquires proximity AP information from a nearby device. In other words, a wearable device with a WLAN function identifies a proximity AP by performing active scanning with low transmission power, and deliver a Service Set IDentifier (SSID) of the identified AP to the controller 10 through the short-range communication module 20. As another example, when the user runs an application, the controller 10 determines an SSID of a matching AP as that of a proximity AP from the running application.

Additionally, the controller 10 uses an SSID, which is an ID of an AP, in order to access only an AP of a particular operator. In other words, the controller 10 considers only an AP of a particular operator as a proximity AP, by performing a procedure for determining whether an SSID of an arbitrary AP is that of a particular operator, when performing scanning for each channel.

When it is determined that the arbitrary AP is a proximity AP, the controller 10 determines the congestion of the particular channel using BSS load information included in a beacon frame received from the arbitrary AP.

The BSS load information that is used to determine the congestion of the channel by the controller 10 is configured as shown in Table 1 below. The BSS load information in Table 1 is information that is disclosed in the IEEE 802.11 standard.

TABLE 1

2.1 Available WLAN load information in WLAN.

Following message element can be provided in Beacon frames and Probe Response frames for WLAN load information by an AP (Access Point) in WLAN [2]:.
BSS Load element (may be included in Beacon/Probe Response frames).

| | Element ID | Length (5) | Station Count | Channel Utilization | Available Admission Capacity |
|---|---|---|---|---|---|
| Octets: | 1 | 1 | 2 | 1 | 2 |

FIG. 1 BSS Load element format [2].

Station Count: the total number of STAs (stations) currently associated.
Channel Utilization: the percentage of time, linearly scaled with 255 representing 100%, that the AP sensed the medium was busy. i.e. .

Channel Utilization =

$$\text{Integer}\left(\frac{\text{channel busy time}}{\text{\# of measured consecutive beacon intervals} \times \text{beacon period} \times 1024} \times 255\right).$$

Available Admission Capacity: the remaining amount of medium time available via explicit admission control.
Based on the fields in BSS Load element, an UE may decide to connect to the AP.

Using the BSS load information shown in Table 1, the controller 10 determines the congestion of a particular channel. In other words, the controller 10 determines that a channel in which an AP has transmitted a beacon frame is congested, when channel utilization included in the BSS load information exceeds a predetermined threshold. In addition, the controller 10 determines the congestion of the channel in consideration of at least one of station count (or the number of users that have accessed an AP) and available admission capacity, like the channel utilization included in the BSS load information.

When it is determined that the particular channel is congested, the controller 10 controls the short-range communication module 20 to switch to another channel and performs AP scanning. Therefore, the UE selectively utilizes the beacon frame received from the proximity AP.

When the particular channel is not congested, the controller 10 controls the short-range communication module 20 to perform scanning for other APs included in the particular channel during a scanning duration. The controller 10 configures a set of APs that have been scanned during the scanning duration and stores an AP list including information about the AP scanned for each channel in the memory 30. The AP list stores a beacon frame for each AP scanned for each channel, as information about the scanned AP. The controller 10 searches the AP list for the best AP and accesses the best AP.

The scanning duration does not exceed the beacon interval of 100 ms, for each channel, and when the number of additionally scanned APs is sufficient even before the current time value reaches the beacon interval value, the controller 10 stops the AP scanning.

In the initial scanning operation according to various embodiments of the present disclosure, when the channel in which a proximity AP exist is low in congestion, the UE additionally scans an AP in the low-congestion channel or scans an AP for all channels.

Figure 2:
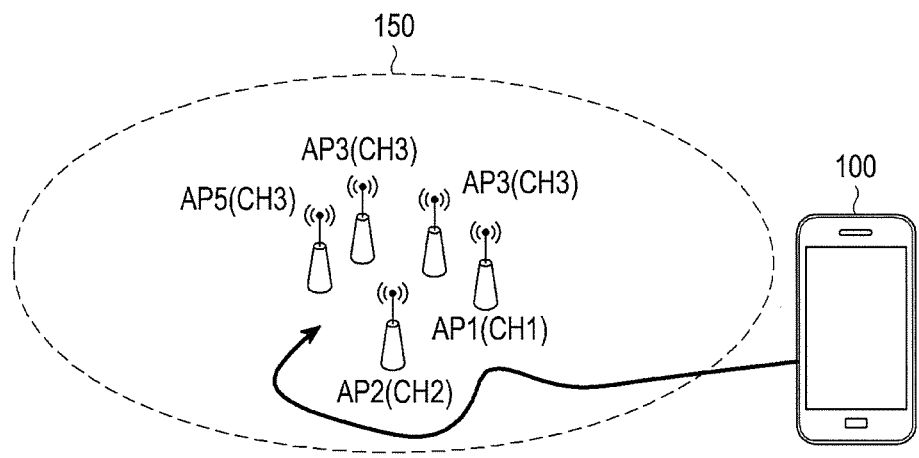
FIGS. 2, 3A and 3B illustrate an example of performing an initial scanning operation by a UE according to various embodiments of the present disclosure.
Figure 3A:
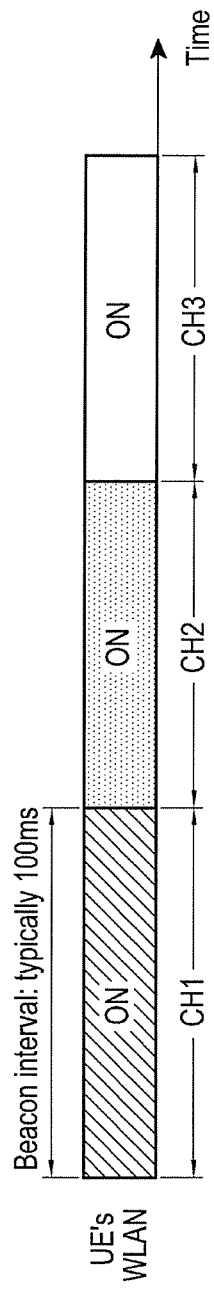
Figure 3B:
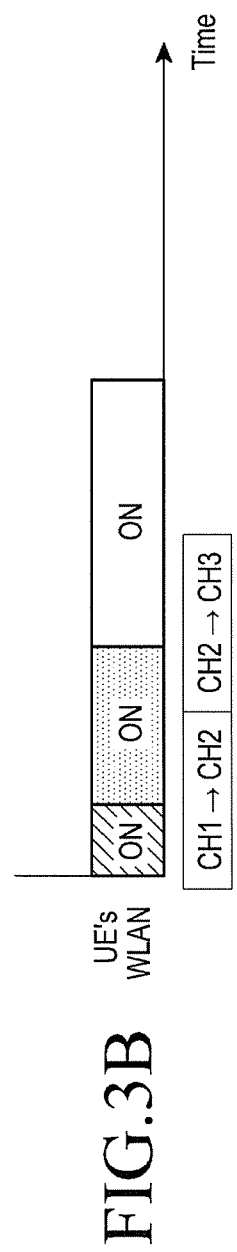

FIGS. 2, 3A and 3B illustrate an example of performing an initial scanning operation by a UE according to various embodiments of the present disclosure.

Referring to FIGS. 2, 3A and 3B, when a UE 100 enters a particular cell 150, the UE 100 receives a beacon frame from an AP1 for a first channel CH1. Then, the UE 100 determines whether the AP1 that has transmitted the beacon frame is a proximity AP, and when the AP1 a proximity AP, the UE 100 determines the congestion of the first channel by checking the channel utilization included in BSS load information of the beacon frame received from the AP1. When the first channel is congested, the UE 100 stops the AP scanning for the first channel before the current time value reaches the beacon interval value of 100 ms in FIG. 3A and starts AP scanning for a second channel. While the UE 100 is performing AP scanning for the second channel in the same method as that of the first channel, when the second channel, like the first channel, is congested even though an AP2 of the second channel is a proximity AP, the UE 100 stops the AP scanning for the second channel, and start AP scanning for a third channel. When an AP3 that has first transmitted a beacon frame in the third channel is a proximity AP and when it is determined that the third channel is not congested based on the channel utilization included in BSS load information of the beacon frame received from the AP3, the UE 100 scans APs operating on the third channel during the beacon interval. Accordingly, the UE 100 configures a set of information about at least one AP scanned in the third channel, and stores the configured information in an AP list.

Next, a description will be made of how the controller 10 performs a re-scanning operation according to various embodiments of the present disclosure.

The re-scanning operation is performed in the same location as the location where the initial scanning operation was performed (i.e., when the UE has not moved). The re-scanning operation is performed after a predetermined time when it is determined as a result of the initial scanning operation that all channels are high in congestion, in a case where the UE has not moved from the location where the initial scanning operation was performed. When it is determined that the current communication channel is high in congestion, the re-scanning operation is performed for the other channels except for the current communication channel. The re-scanning operation is performed at predetermined intervals depending on the initial settings of the UE.

First, the controller 10 stores information about the time that the UE received a beacon frame from the best AP that was searched for each channel in the initial scanning operation based on the initial clock of the UE. When performing re-scanning, the controller 10 predicts the time that a beacon frame is to be received using the periodic transmission characteristics of the beacon frame, performs AP scanning only at the predicted time, and then updates the congestion of the channel.

Since it is difficult for the controller 10 to predict the exact time that a beacon frame is to be received, the predicted time is represented as a beacon reception window value for a time interval, and when there is no window overlap between the best APs that use different channels, the controller 10 performs scanning for a plurality of channels in one beacon interval.

The beacon reception window value is a value that is set to prepare for a clock skew that occurs in an AP. Typically, since the clock skew of an AP is around 20 ppm (i.e., 20×10-6), an error of about 1 msec occurs per minute. Therefore, the beacon reception window size is increased depending on the time that the UE performs re-scanning. For example, when re-scanning is performed after 100 sec, the beacon reception window value is set to 2 msec (=20 ppm×100 sec).

In other words, the controller 10 switches to the channel at a predetermined predicted time using the beacon reception window value and receives a beacon frame from an AP of the channel.

The controller 10 determines the priority among channels included in a channel list including the channels in which a proximity AP exists, switches to a high-priority channel, and receives a beacon frame from an AP of the high-priority channel. The priority among channels is determined in consideration of at least one of the signal strength between the UE and the proximity AP included in the channel, the congestion of the channel, and the user preference.

The controller 10 updates the congestion of the channel based on the BSS load information included in the received beacon frame. Upon detecting a low-congestion channel, the controller 10 controls the short-range communication module 20 to additionally scan an AP during a scanning duration for the channel as in the initial scanning operation and selects the best AP that can communicate with the UE with the highest signal strength.

The method of using the beacon reception window value is an operation that is performed only for the channel in which the UE detected the best AP in the initial scanning operation. When all of the best APs are congested, the controller 10 scans APs for a new channel in the same operation as the initial scanning operation.

Figure 4:
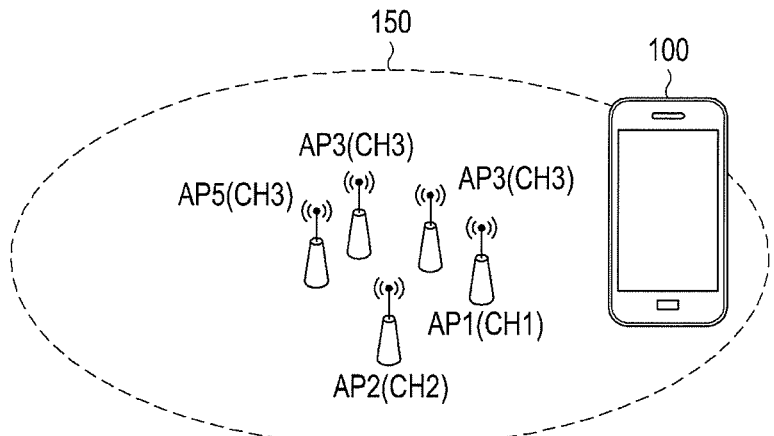
FIGS. 4, 5A and 5B illustrate an example of performing a re-scanning operation by a UE according to various embodiments of the present disclosure.
Figure 5A:
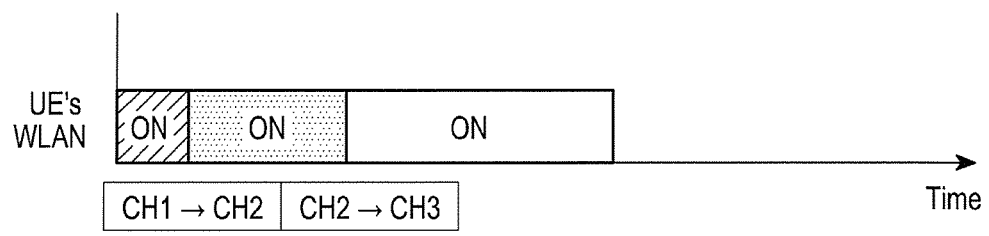
Figure 5B:
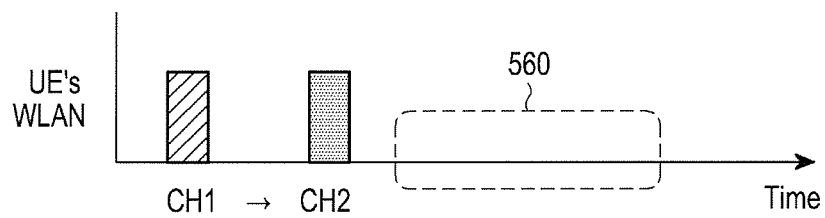

FIGS. 4, 5A and 5B illustrate an example of performing a re-scanning operation by a UE according to various embodiments of the present disclosure. In FIGS. 4, 5A and 5B, AP scanning for a first channel and a second channel was performed during initial scanning.

Referring to FIGS. 4, 5A and 5B, when the UE 100 has not moved from the previous location and desires to perform re-scanning, the UE 100 determines a beacon reception window value for each channel. When the beacon interval is 100 ms and the beacon reception window size is 20 ms, the UE 100 determines a beacon reception window value of a first channel as 100 ms+x+2 ms and determines a beacon reception window value of a second channel as 100 ms+y+2 ms. In certain embodiments, x and y represent the time that the UE 100 received a beacon frame from an AP that was selected in each channel in the initial scanning operation.

The UE 100 receives a beacon frame from the AP at the beacon reception window value determined for each channel and determines the congestion of the channel using the BSS load information included in the received beacon frame. The UE 100 updates the channel list depending on the determined congestion of the channel. The UE 100 deletes the channel from the channel list when the channel is congested. When the second channel is not congested, the UE 100 scans at least one AP operating on the second channel during the scanning duration, configures a set of information about at least one AP scanned in the second channel, and stores the configured information in an AP list.

In various embodiments of the present disclosure, when the second channel is not congested in the initial scanning operation, the UE 100 performs re-scanning for APs operating on the second channel in the re-scanning operation, so the UE 100 updates the AP list depending on the current channel status. When the first channel is congested in the re-scanning operation even though the first channel was not congested in the initial scanning operation, the UE 100 updates the channel list.

When the UE 100 discovers a new third channel, the UE 100 scans an AP for the third channel in the same operation as the initial scanning operation, as shown by reference numeral 560. The UE 100 receives a beacon frame from an arbitrary AP of a third channel and determines whether the arbitrary AP is a proximity AP, and when arbitrary AP is a proximity AP, the UE 100 determines the congestion of the third channel. When it is determined that the third channel is not congested, the UE 100 scans at least one AP operating on the third channel during the scanning duration, configures a set of information about at least one AP scanned in the third channel, and stores the configured information in an AP list.

Figure 6:
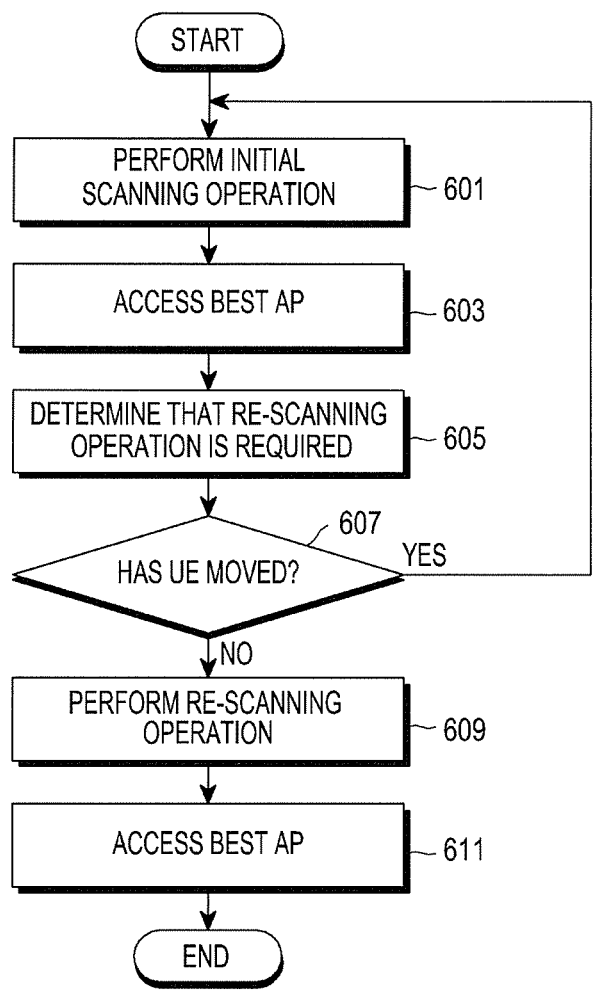
FIG. 6 illustrates a method for performing AP scanning by a UE according to various embodiments of the present disclosure.

FIG. 6 illustrates a method for performing AP scanning by a UE according to various embodiments of the present disclosure.

Referring to FIG. 6, in operation 601, the UE performs an initial scanning operation for scanning APs for each channel in the current location. When an arbitrary AP is a proximity AP in the channel, the UE receives a beacon frame from the proximity AP, and determines the congestion of the channel for the proximity AP based on the received beacon frame. When the channel for the proximity AP is not congested, the UE scans at least one other AP operating on the channel.

In operation 603, when the initial scanning operation is completed, the UE searches for the best AP based on the AP list including AP information for each channel and accesses the searched AP.

In operation 605, the UE determines that the re-scanning operation is required, when all channels are high in congestion as a result of the initial scanning, when the current communication channel is high in congestion, or when the UE is preset to re-scan an AP at predetermined intervals. The UE determines in operation 607 whether the UE has moved from the location where the initial scanning operation was performed, and when the UE has not moved after performing the initial scanning operation, the UE performs the re-scanning operation in operation 609. During the re-scanning operation, the UE predicts the time that a beacon frame is to be received using periodic transmission characteristics of the beacon frame, performs AP scanning only at the predicted time, and then updates the channel list and the AP list.

When the re-scanning operation is completed, the UE re-searches for the best AP based on the updated AP list and accesses the re-searched AP in operation 611.

Figure 7:
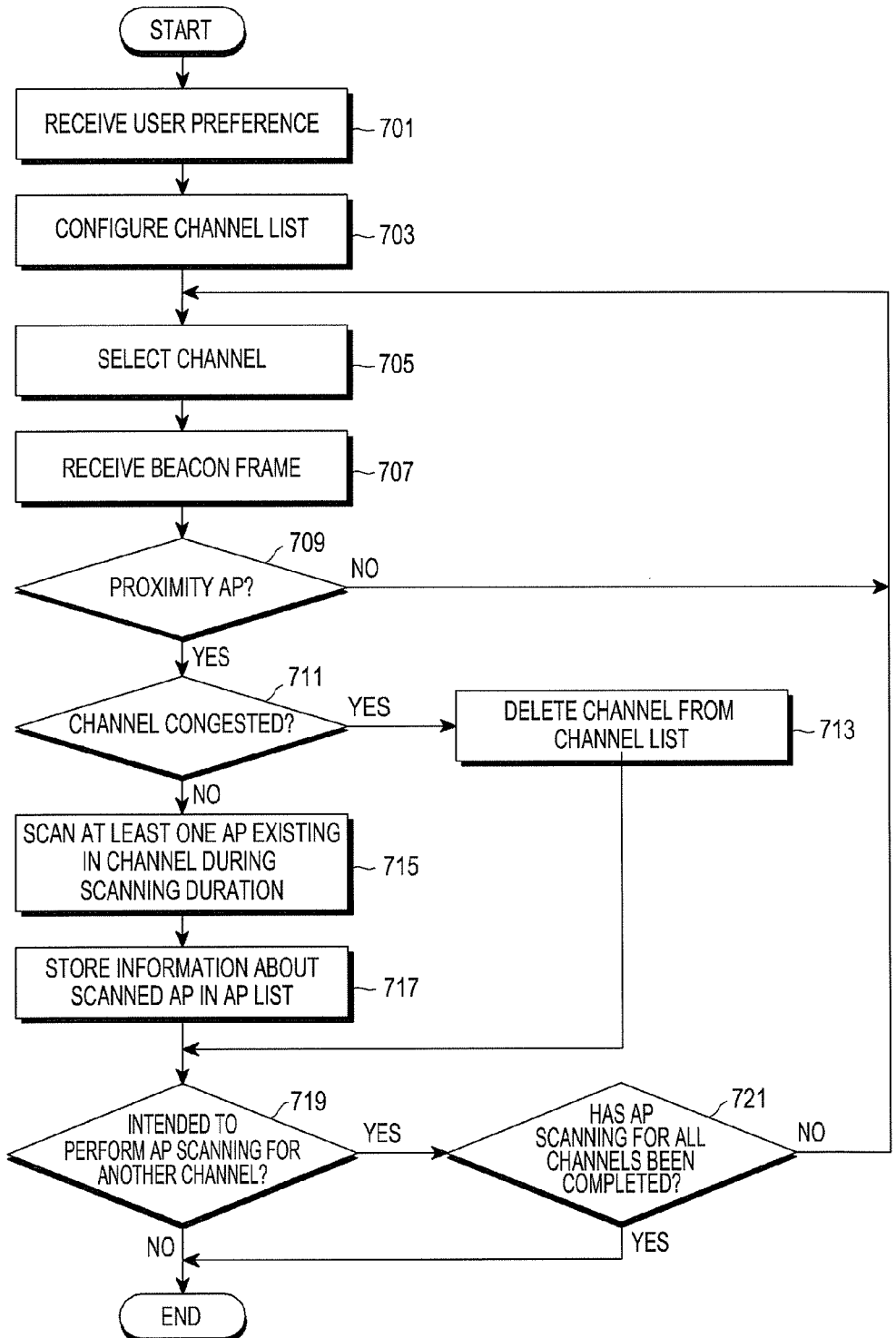
FIG. 7 illustrates an example of performing an initial scanning operation 601 by a UE according to various embodiments of the present disclosure.

FIG. 7 illustrates an example of performing an initial scanning operation 601 by a UE according to various embodiments of the present disclosure.

Referring to FIG. 7, in operation 701, the UE receives, from the user, at least one of a parameter for determining a proximity AP, a parameter for determining congestion of a channel, and a desired channel. In operation 703, the UE configures a channel list based on which the UE will perform initial scanning. The UE selects one channel from the channel list in operation 705 and receives a beacon frame from an arbitrary AP in the selected channel in operation 707. When a desired channel is entered from the user, the UE selects the user desired channel from the channel list.

The UE determines in operation 709 whether the AP that transmitted the beacon frame is a proximity AP. When the AP that transmitted the beacon frame is a proximity AP, the UE determines in operation 711 whether the selected channel is congested, based on the BSS load information included in the received beacon frame. When the AP that transmitted the beacon frame is not a proximity AP, the UE keeps the same channel and wait until the UE receives a beacon frame from a proximity AP. When there is no proximity AP for 10 ms, the UE selects gain a channel from the channel list in operation 705.

When it is determined that the selected channel is congested, the UE deletes the selected channel from the channel list in operation 713 and determines in operation 719 whether to perform AP scanning for other channels. When the selected channel is not congested, the UE scans at least one AP operating on the selected channel during the scanning duration in operation 715. The UE receives a beacon frame from at least one AP operating on the selected channel during the scanning duration.

In operation 717, the UE stores information about the scanned AP in an AP list. The AP list stores a beacon frame for each AP scanned for each channel, as information about the scanned AP.

The UE that has completed the AP scanning for the selected channel determines in operation 719 whether to continuously perform AP scanning for other channels. When the UE determines to perform AP scanning for other channels depending on the system or the system setting, the UE determines in operation 721 whether AP scanning for all channels has been completed. When the UE determines not to perform AP scanning for other channels or when AP scanning for all channels has been completed, the UE terminates the initial scanning operation. When AP scanning for all channels has not been completed, the UE selects another channel from the channel list in operation 705 and performs AP scanning for the selected channel.

Figure 8:
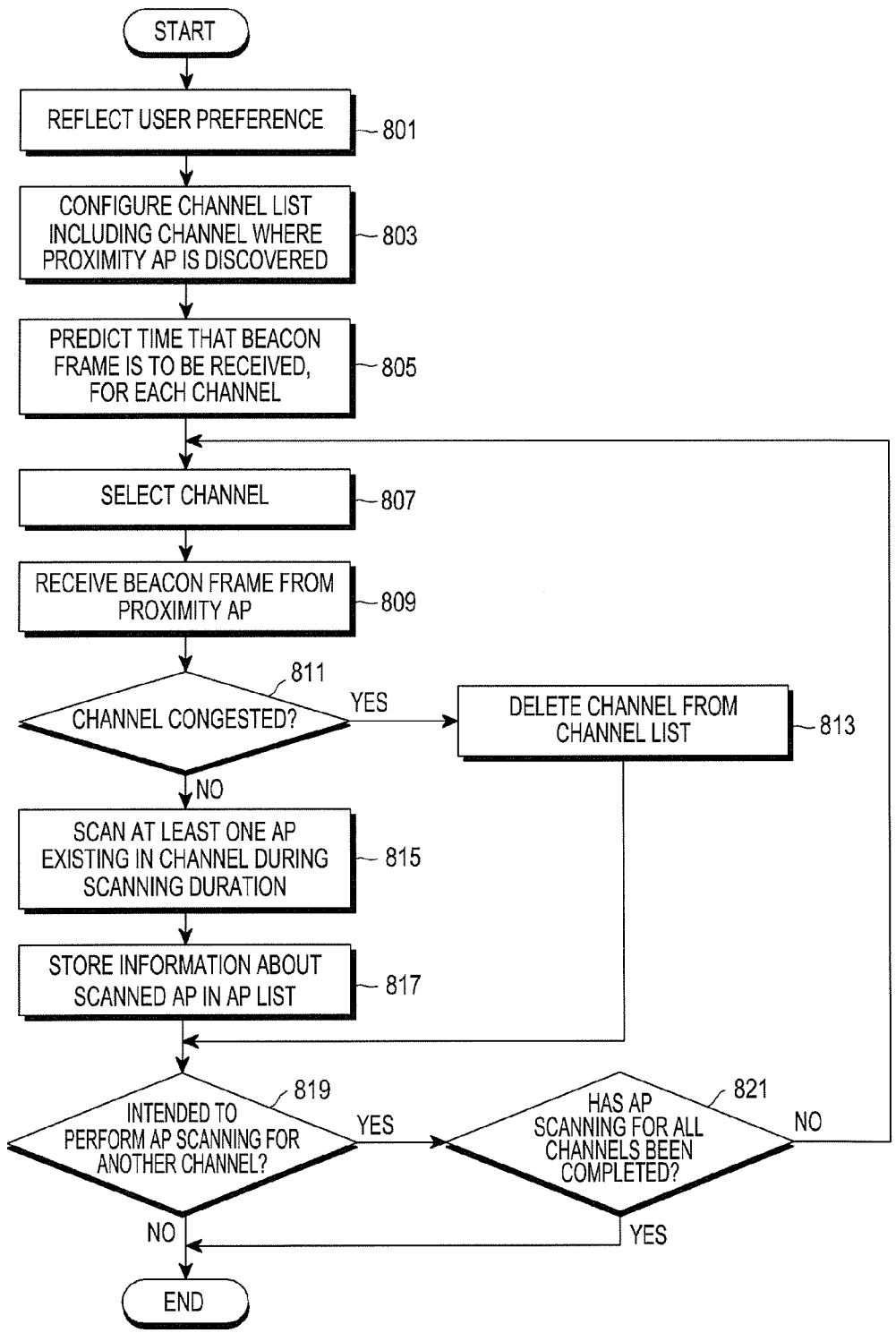
FIG. 8 illustrates an example of performing a re-scanning operation 609 by a UE according to various embodiments of the present disclosure.

FIG. 8 illustrates an example of performing a re-scanning operation 609 by a UE according to various embodiments of the present disclosure.

Referring to FIG. 8, in operation 801, the UE receives, from the user, at least one of a parameter for determining a proximity AP, a parameter for determining congestion of a channel, and a desired channel. In certain embodiments, the UE uses the value that is entered in operation 701 of the initial scanning operation, without performing operation 801.

In operation 803, the UE configures a channel list including a channel in which a proximity AP was discovered in the initial scanning operation. In operation 805, the UE predicts the time that a beacon frame is to be received for each channel, in consideration of the time that the UE has received a beacon frame from the best AP that was searched for each channel in the initial scanning operation.

The UE selects one channel from the channel list in operation 807 and receives a beacon frame from a proximity AP at the predicted time that a beacon frame is to be received, for the selected channel, in operation 809. When selecting one channel in operation 807, the UE determines the priority among channels included in the channel list, switches to a high-priority channel, and receives a beacon frame from an AP of the high-priority channel. The priority among channels is determined in consideration of at least one of the signal strength between the UE and the proximity AP included in the channel, the congestion of the channel, and the user preference.

The UE determines in operation 811 whether the selected channel is not congested based on the BBS load information included in the received beacon frame. When the selected channel is congested in the current situation, the UE deletes the selected channel from the channel list in operation 813. When the selected channel is still not congested, the UE scans at least one AP operating on the selected channel during the scanning duration in operation 815. The UE receives a beacon frame from at least one AP operating on the selected channel during the scanning duration.

In operation 817, the UE stores information about the scanned AP in an AP list. When information about the AP scanned in the initial scanning operation is different from information about the AP scanned in the re-scanning operation, the AP list is updated depending on the current situation.

The UE that has completed the AP scanning for the selected channel determines in operation 819 whether to continuously perform AP scanning for other channels. When the UE determines to perform AP scanning for other channels depending on the system or the system setting, the UE determines in operation 821 whether AP scanning for all channels existing in the channel list has been completed. When the UE determines not to perform AP scanning for other channels or when AP scanning for all channels has been completed, the UE terminates the re-scanning operation. When AP scanning for all channels has not been completed, the UE selects another channel from the channel list in operation 807, and continuously perform AP scanning.

When the UE scans an AP according to various embodiments of the present disclosure, the following energy saving effect is achieved.

When the number of channels existing in the network is represented by N, a ratio of a beacon reception window to a beacon interval per channel is represented by B, and the number of channels in which a proximity AP exists is represented by M, the AP scanning method according to various embodiments of the present disclosure reduces the energy by M/N*B for each AP scanning, compared to the conventional blind AP scanning method. For example, when the number N of channels existing in a 5 GHz band is 20, B is 0.1, and M is 5, the AP scanning method according to various embodiments of the present disclosure reduces the energy by 97.5% for each AP scanning, compared to the conventional blind AP scanning method.

As is apparent from the foregoing description, the UE quickly scans an AP in consideration of the proximity of an AP and the congestion of a channel, making it possible to minimize the power consumption of the UE. Accordingly, the UE quickly accesses the best AP that can communicate with the UE with the highest signal strength.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for scanning an access point (AP) in a wireless communication system, the method comprising:

receiving a beacon frame from a proximity AP located within a proximity of a user equipment (UE);

scanning, based on load information included in the beacon frame received from the proximity AP, at least one AP through a channel on which the beacon frame has been received;

identifying a first AP with a highest signal strength among the at least one scanned AP;

receiving a beacon frame from the first AP at a predicted time;

determining whether the channel is congested based on the beacon frame received from the first AP at the predicted time; and re-scanning the at least one AP through the channel, if the channel is congested.

2. The method of claim 1, wherein scanning at least one AP through a channel on which the beacon frame has been received, based on load information included in the beacon frame received from the proximity AP comprises:

determining whether the channel is congested based on the load information included in the beacon frame received from the proximity AP; and scanning the at least one AP through the channel, if the channel is not congested.

3. The method of claim 2, wherein determining whether a channel is congested comprises:

checking basic service set (BSS) load information included in the beacon frame received from the proximity AP; and determining whether the channel is congested in consideration of at least one of a channel utilization, a number of users that have accessed an AP, and an available admission capacity, all of which are included in the BSS load information.

4. The method of claim 2, further comprising:

if the channel is congested, deleting the channel from a channel list;

determining whether to perform AP scanning for another channel other than the deleted channel;

if it is determined to perform AP scanning for another channel other than the deleted channel, determining whether AP scanning for all channels included in the channel list that includes all channels existing in a network is completed;

if AP scanning for all channels is not completed, determining whether a proximity AP exists in the other channel; and if a proximity AP exists in the other channel and the other channel is not congested, scanning at least one AP through the other channel.

5. The method of claim 2, further comprising:

after scanning at least one AP through the channel, determining whether to perform AP scanning for another channel other than the channel;

if it is determined to perform AP scanning for another channel other than the channel, determining whether AP scanning for all channels included in a channel list that includes all channels in which a proximity AP exists is completed;

if AP scanning for all channels is not completed, determining whether a proximity AP exists in the other channel; and if a proximity AP exists in the other channel and the other channel is not congested, scanning at least one AP through the other channel.

6. The method of claim 2, wherein re-scanning the at least one AP through the channel, based on a beacon frame received from the first AP at a predicted time for beacon frame transmission comprises:

determining whether to perform re-scanning for an AP in the channel; and predicting a time that a beacon frame is to be transmitted from the first AP, if it is determined to perform the re-scanning.

7. The method of claim 6, wherein the re-scanning is performed, if all channels are high in congestion, if the channel is high in congestion, or if the UE is set to perform re-scanning at predetermined intervals in a situation where the UE has not moved from a location where the UE scanned at least one AP through the channel.

8. The method of claim 6, further comprising:

after re-scanning at least one AP through the channel, determining whether to perform AP scanning for another channel other than the channel;

if it is determined to perform AP scanning for another channel other than the channel, determining whether AP scanning for all channels included in a channel list that includes all channels existing in a network is completed;

if AP scanning for all channels is not completed, determining whether a proximity AP exists in the other channel; and if a proximity AP exists in the other channel and the other channel is not congested, scanning at least one AP through the other channel.

9. The method of claim 6, wherein determining whether the channel is congested comprises:

checking basic service set (BSS) load information included in the beacon frame received from the first AP; and determining whether the channel is congested in consideration of at least one of a channel utilization, a number of users that have accessed an AP, and an available admission capacity, all of which are included in the BSS load information.

10. The method of claim 1, wherein the channel is a channel having a highest priority among a plurality of channels.

11. The method of claim 10, wherein the highest priority is determined in consideration of at least one of a signal strength between the UE and a proximity AP through each channel, a congestion of a channel, and a user preference.

12. The method of claim 1, wherein the proximity AP is determined based on at least one of a signal strength of the beacon frame, a location information of an AP that is received from a base station or a server, a global positioning system (GPS) information, a location information of an AP that is included in the beacon frame, a proximity AP information received from a nearby device, a proximity AP information received from a running application, and an AP information of a specific operator.

13. The method of claim 1, wherein the channel is a channel selected by a user.

14. The method of claim 1, wherein the channel is a channel operated by a specific operator.

15. An apparatus for scanning an access point (AP) in a wireless communication system, the apparatus comprising:

a transceiver configured to transmit and receive data; and a controller configured to:

control to receive a beacon frame from a proximity AP located within a proximity of a user equipment (UE);

scan, based on load information included in the beacon frame received from the proximity AP, at least one AP through a channel on which the beacon frame has been received;

identify a first AP with a highest signal strength, among the at least one scanned AP;

receive a beacon frame from the first AP at a predicted time;

determine whether the channel is congested based on the beacon frame received from the first AP at the predicted time; and re-scan the at least one AP through the channel, if the channel is congested.

16. The apparatus of claim 15, wherein the controller is configured to:

determine whether the channel is congested based on the load information included in the beacon frame received from the proximity AP; and scan the at least one AP through the channel if the channel is not congested.

17. The apparatus of claim 16, wherein the controller is configured to:

after scanning at least one AP through the channel, determine whether to perform AP scanning for another channel other than the channel;

if it is determined to perform AP scanning for another channel other than the channel, determine whether AP scanning for all channels included in a channel list that includes all channels in which a proximity AP exists is completed;

if AP scanning for all channels is not completed, determine whether a proximity AP exists in the other channel; and if a proximity AP exists in the other channel and the other channel is not congested, control the short-range communication module to scan at least one AP through the other channel.

18. The apparatus of claim 16, wherein the controller is configured to:

if the channel is congested, delete the channel from a channel list;

determine whether to perform AP scanning for another channel other than the deleted channel;

if it is determined to perform AP scanning for another channel other than the deleted channel, determine whether AP scanning for all channels included in the channel list that includes all channels existing in a network is completed;

if AP scanning for all channels is not completed, determine whether a proximity AP exists in the other channel; and if a proximity AP exists in the other channel and the other channel is not congested, control the short-range communication module to scan at least one AP through the other channel.

19. The apparatus of claim 16, wherein the controller is further configured to:

check basic service set (BSS) load information included in the beacon frame received from the proximity AP; and determine whether the channel is congested in consideration of at least one of a channel utilization, a number of users that have accessed an AP, and an available admission capacity, all of which are included in the BSS load information.

20. The apparatus of claim 16, wherein the controller is configured to:

determine whether to perform re-scanning for an AP in the channel; and predict a time that a beacon frame is to be transmitted from the first AP, if it is determined to perform the re-scanning.

21. The apparatus of claim 20, wherein the controller is further configured to:

check basic service set (BSS) load information included in the beacon frame received from the first AP; and determine whether the channel is congested in consideration of at least one of channel utilization, a number of users that have accessed an AP, and available admission capacity, all of which are included in the BSS load information.

22. The apparatus of claim 20, wherein the controller is configured to:

after re-scanning at least one AP through the channel, determine whether to perform AP scanning for another channel other than the channel;

if it is determined to perform AP scanning for another channel other than the channel, determine whether AP scanning for all channels included in a channel list that includes all channels existing in a network is completed;

if AP scanning for all channels is not completed, determine whether a proximity AP exists in the other channel; and if a proximity AP exists in the other channel and the other channel is not congested, control the short-range communication module to scan at least one AP through the other channel.

23. The apparatus of claim 20, wherein the re-scanning is performed, if all channels are high in congestion, if the channel is high in congestion, or if the UE is set to perform re-scanning at predetermined intervals in a situation where the UE has not moved from a location where the UE scanned at least one AP through the channel.

24. The apparatus of claim 15, wherein the proximity AP is determined based on at least one of a signal strength of the beacon frame, a location information of an AP that is received from a base station or a server, a global positioning system (GPS) information, a location information of an AP that is included in the beacon frame, a proximity AP information received from a nearby device, a proximity AP information received from a running application, and an AP information of a specific operator.

25. The apparatus of claim 15, wherein the channel is a channel having a highest priority among a plurality of channels.

26. The apparatus of claim 25, wherein the highest priority is determined in consideration of at least one of a signal strength between the UE and a proximity AP through each channel, a congestion of a channel, and a user preference.

27. The apparatus of claim 15, wherein the channel is a channel selected by a user.

28. The apparatus of claim 15, wherein the channel is a channel operated by a specific operator.

* * * * *